United States Patent [19]

Levinson et al.

[11] 4,276,578

[45] Jun. 30, 1981

[54] ARRESTER WITH GRADED CAPACITANCE VARISTORS

[75] Inventors: Lionel M. Levinson, Schenectady; Howard F. Ellis, Stephentown, both of N.Y.; Herbert Fishman, Pittsfield, Mass.

[73] Assignee: General Electric Company, Schenectady, N.Y.

[21] Appl. No.: 37,874

[22] Filed: May 10, 1979

[51] Int. Cl.[3] .......... H02H 3/22

[52] U.S. Cl. .......... 361/127; 338/21

[58] Field of Search .......... 361/126, 127, 117; 338/21

[56] References Cited

U.S. PATENT DOCUMENTS

| | | | |
|---|---|---|---|
| 3,863,111 | 1/1975 | Martzloff | 361/127 X |
| 4,100,588 | 7/1978 | Kresge | 361/127 |

FOREIGN PATENT DOCUMENTS

| | | | |
|---|---|---|---|
| 2821939 | 11/1978 | Fed. Rep. of Germany | 361/127 |

OTHER PUBLICATIONS

"The Physics of Metal Oxide Varistors" —Levinson et al., Jr. of Applied Physics, vol. 46, No. 3, 3/1975.

*Primary Examiner*—Harry E. Moose, Jr.
*Attorney, Agent, or Firm*—Alexander M. Gerasimow; James C. Davis; Marvin Snyder

[57] ABSTRACT

A station arrester employing metal oxide varistors has varistors whose capacitances increase in a direction measured from the ground side of the arrester. An approximately uniform voltage distribution can be produced across the varistors when appropriately graded according to their positions in the varistor stack. In this configuration, the varistor disks located near the top or line end of the stack are not subjected to increased thermal stresses.

13 Claims, 2 Drawing Figures

ARRESTER WITH GRADED CAPACITANCE VARISTORS

BACKGROUND OF THE INVENTION

This invention relates to station arresters and more particularly to station arresters including a stack of metal oxide varistors in which the capacitance of the varistors is graded so as to produce a more uniform distribution of voltage throughout the stack.

A station arrester is an electrical protective device which acts to protect transmission lines, transformers, and other equipment from excess voltage pulses arising from natural conditions such as lightning or from power system sources such as transient surges. Present station arresters typically comprise a stack of metal oxide varistors disposed in a cylindrical porcelain housing having external fin-like protrusions thereon for increasing the arc path length. The varistors are disposed in a stack; the top most varistor in the stack being connected to a line terminal of the arrester and the bottom varistor being connected to a ground terminal of the arrester. These terminals serve to electrically connect the arrester into the power system it is to protect. Metal oxide varistors are nonlinear resistive devices which under normal conditions exhibit a high resistance value; but which, when subjected to voltages in excess of their breakdown voltages, exhibit a very low resistance thereby acting as a protective device since destructive currents are shunted through the varistor stack. These varistors typically have high energy absorption capabilities and are well suited to act as protective devices. Nonetheless, in the station arrester application, the varistors are subject to the continual presence of the line power voltage. However, this line voltage is typically well below the varistor breakdown voltage. In this normal ambient state, the varistors exhibit a high resistance, but nonetheless some current does flow predominantly but not only by capacitive action.

Each varistor in the stack can be approximately modeled by a variable resistor in parallel with a capacitance, $C_v$. Additionally, each varistor in the stack has associated with it a coupling capacitance to ground, $C_g$. This group capacitance is approximately the same for each varistor in the stack. The capacitance $C_v$ associated with each individual varistor is an intrinsic property of metal oxide varistors produced from a sintered mixture of zinc oxide and various metal oxide additives. As a result of the capacitance effect, particularly the ground capacitance, a larger current flows through the top (i.e., line) varistors in the stack since the upper varistors also pass the capacitive ground currents which flow through the lower varistors. A larger current in these upper varistors subjects them to a greater level of power dissipation which results in a higher operating temperature and inferior stability for these varistor disks thereby acting to decrease the actual useful life of the arrester because of premature failures of the upper or line side varistor disks.

The conventional solutions to the nonuniform distribution of voltage and watts loss in the varistor stack require the tailoring of the capacitances of varistors by placing them in parallel with low dissipation capacitors. This method is expensive and cumbersome because it involves added costs associated with high voltage capacitors, connectors, and leads and, additionally, because of the requirement for additional space in the arrester housing, which space is expensive to provide because of the high cost of the housing itself. Nonetheless, the net capacitances are graded so that the varistor nearest the line terminal is connected in parallel with a capacitor having a greater capacitance than is the capacitance connected in parallel with a varistor closer to the ground terminal of the stack.

SUMMARY OF THE INVENTION

In accordance with a preferred embodiment of the present invention, an arrester comprises a housing in which there is disposed a stack of metal oxide varistors, the top of the stack being connected to the line terminal and the bottom of the stack being connected to the ground terminal. The varistors in the stack are graded so that the varistors exhibit increased capacitance with increased proximity to the line terminal. In particular, if the capacitance $C_{vi}$ of the $i^{th}$ varistor in the stack is selected to be approximately $C_O+C_g(N-i)^2/2$, where $N+1$ is the number of varistors in the stack, $C_O$ is the capacitance of the varistor connected to the ground terminal, i is an integer indicating the position of the varistor in the stack, and $C_g$ is the ground capacitance for each varistor, then it is found that the voltage distribution across the varistors is approximately uniform.

Accordingly, it is the object of the present invention to provide an arrester for surge protection of power transmission lines exhibiting long life and uniform distribution of energy loss in each varistor without the cumbersome necessity for separate grading capacitances.

DETAILED DESCRIPTION OF THE INVENTION

Figure 1:
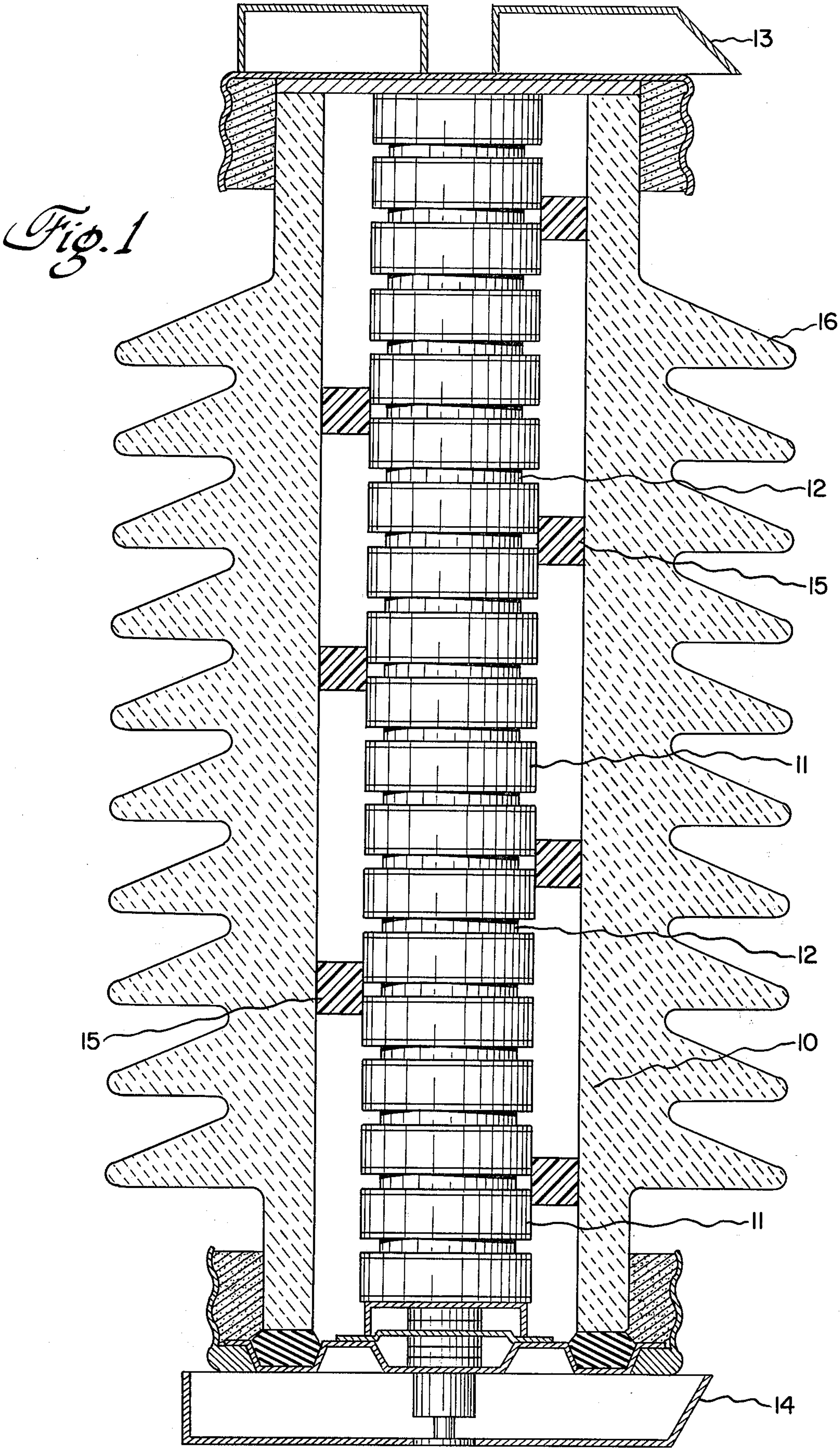
FIG. 1 is a partial cross-sectional elevation view illustrating the construction of a typical arrester employing metal oxide varistor disks.

FIG. 1 illustrates a conventional station arrester employing a varistor stack. Arrester housing 10 typically comprises a procelain cylindrical structure having finned shaped projections 16 on the exterior thereof to increase the discharge arc path along the exterior of the arrester housing 10. A stack of serially connected metal oxide varistors 11 are disposed along the hollow portion of the housing so that the top varistor is in electrical contact with the line terminal 13 of the arrester and the bottom varistor of the stack is in electrical contact with the ground terminal 14 of the arrester. Also, spacers 15, typically configured as partial annular sections, are conventionally employed internal to the housing. Such spacing material affects the varistor-to-ground capacitance discussed immediately below. The varistors 11 are somewhat spaced apart and electrically connected through the conducting plates 12 typically comprising a soft metal such as lead.

Figure 2:
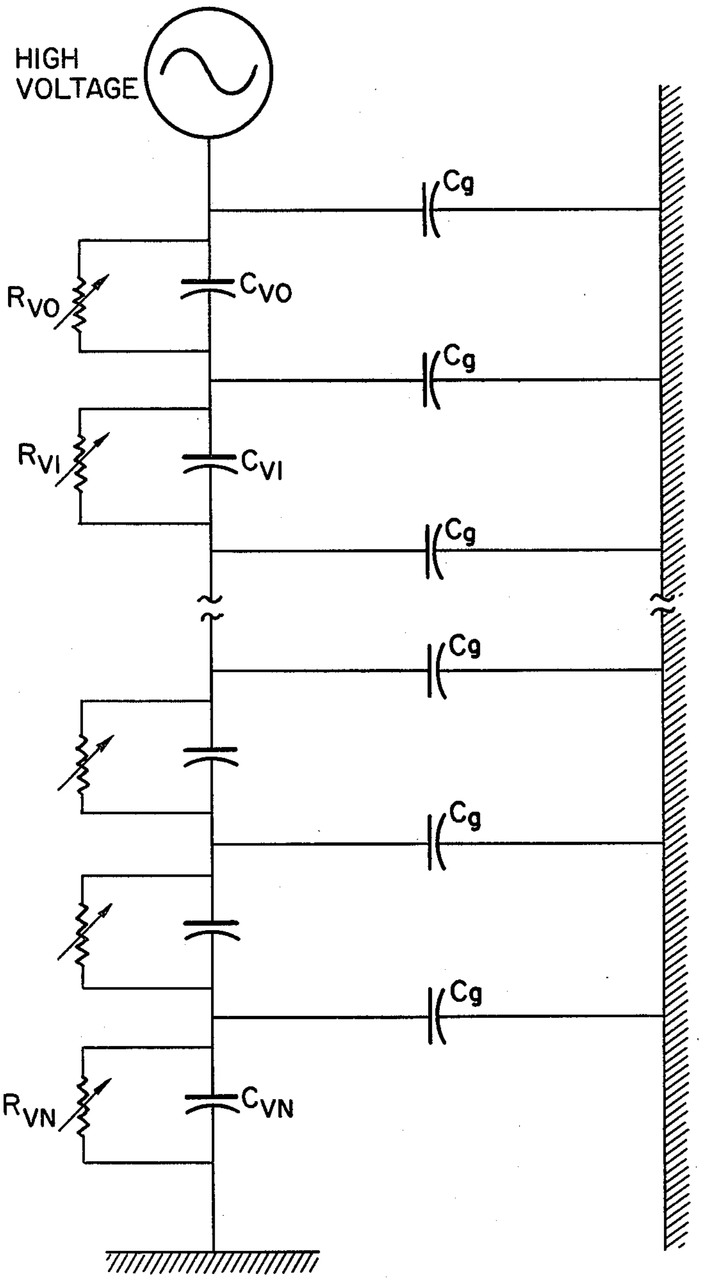
FIG. 2 is an electrical circuit diagram illustrating an equivalent circuit for the arrester stack of FIG. 1.

As described above, the varistors nearer to the line side of the arrester are subject to greater currents and concomitantly greater voltage drops and watts losses therein predominately because of capacitive currents arising through the varistor-to-ground capacitance, $C_g$, associated with each varistor. A greater appreciation of this phenomenon can be had by examining the equivalent circuit shown in FIG. 2 where the varistor stack and arrester of FIG. 1 are shown. Each varistor in the stack is modeled by variable resistor $R_{vi}$, $i=0, 1, 2, \ldots$ , N, wherein $R_{vO}$ is that varistor nearest the line end of the stack and $R_{vN}$ is the varistor nearest the ground end of the stack, there being N+1 varistors in the stack. For the $i^{th}$ varistor in the stack as counted from the line end, there is associated with each $R_{vi}$ an intrinsic capacitance $C_{vi}$, as shown. Additionally, there is associated with each varistor in the stack a varistor to ground capacitance $C_g$ effectively connected between the upper electrode contact of each varistor and the ground plane. The ground capacitance $C_g$ is closely associated with the presence of the housing and is approximately equal for each varistor in the stack as shown. As can be appreciated from FIG. 2, the varistors proximal to the high voltage or line side of the arrester are subject to the capacitive currents which flow not only through the varistor stack directly but also to those currents injected into the varistor stack because of the presence of the ground capacitance. In this manner, the varistors in the upper portions of the stack are subjected to larger currents, greater voltage drops across the varistor and concomitant greater watts losses which accordingly have a more deleterious effect upon stability for those varistors near the line side of the arrester.

The problem of variable varistor stability in the stack is significantly reduced by insuring a uniform voltage drop across each varistor in the stack. It is known that by choosing $C_{vi}$ to be equal to $C_O+C_g(N-i)^2/2$ that a uniform voltage drop results. However, as described above, this is conventionally accomplished through the use of separate, lumped capacitive devices connected in parallel with one or more varistors in the stack. However, as indicated, this is a costly cumbersome, and excessively complicated method for insuring uniformity.

In accordance with the present invention, the capacitance of the varistors themselves are selected in a graded fashion so that varistors near the line end of the varistor stack exhibit a greater capacitance. There are several methods for achieving this variation in capacitance. First, the thickness of the varistor disk could be changed. Second, the disk breakdown field could be varied while keeping the varistor thickness fixed. Third, the capacitance of a varistor could be chosen for a fixed varistor thickness and breakdown field. The first method mentioned is not desirable since changing the varistor disk thickness changes the capacitive coupling to ground and the thermal coupling to the exterior environment in a fashion which reduces the effectiveness of the method. The second method changes the varistor disk capacitance since it is inversely proportional to the breakdown field at a fixed thickness. However, increasing the breakdown field also increases the watts loss per unit volume since the watts loss per varistor grain boundary is approximately constant. Accordingly, this second method is also not preferred.

However, the third method as outlined above is preferred and is readily accomplished through varying the antimony trioxide content of varistor manufacture.

In general, the capacitance of a varistor is given by $C_{var}=\epsilon F_1(\epsilon_o A/V_1)$ where $F_1$ is the breakdown field of the variator, A is the area of the varistor, $\epsilon_o$ is the permitivity of free space, $V_1$ is the breakdown voltage of the varistor, and $\epsilon$ is the dielectric constant of the varistor material. Thus, it is seen from the aforementioned formula that the capacitance of a varistor may be controlled by varying quantity $\epsilon F_1$ by holding area and the breakdown voltage of the varistor constant. The quantity $\epsilon F_1$ is controllable by varying the antimony trioxide content as shown in the following table.

TABLE 1

| $Sb_2O_3$ Content (Mole Percent) | $\epsilon F_1 \times 10^{-6}$ (volts/cm) |
|---|---|
| 1.0 | 2.15 |
| 2.0 | 1.14 |
| 5.0 | 0.56 |
| 6.0 | 0.37 |
| 8.0 | 0.26 |
| 10.0 | no varistor action |

The above-mentioned variation in antimony content is produced in a varistor composition having approximately the following constituents: 0.2 mole percent $H_3BO_3$, 0.1 mole percent $BaCO_3$, 0.5 mole percent $Cr_2O_3$, 1.0 mole percent NiO, 0.5 mole percent $MnO_2$, 0.5 mole percent $Co_2O_3$, 0.5 mole percent $Bi_2O_3$, the remainder being zinc oxide, ZnO.

By way of example and not limitation, the following approximate description of the parameters of an arrester are provided. Typical values for the total ground capacitance of a large arrester is approximately 100 picofarads. Hence, in a 30 varistor disk stack, $C_g$ is approximately 3 picofarads ($\approx 100/30$). Additionally, the capacitance of a standard production three inch diameter and one inch thick arrester disk is approximately 2,000 picofarads. Assuming that such a conventional varistor disk is the top disk in the stack, the above formula for $C_{vi}$ is employed to find the capacitance $C_O$ for the bottom varistor in the stack. Applying this formula produces a $C_O$ of 650 picofarads. Thus, such an arrester construction results in a varistor stack with a top disk having a capacitance of approximately 2,000 picofarads and a bottom varistor disk having a capacitance of approximately 650 picofarads, while the other varistor capacitances (in picofarads) are given by $C_{vi}=1.5(30-i)^2+650$. Other varistor stack designs may also be developed using the foregoing analysis and formulas.

It is known that conventional varistor material comprises zinc oxide grains separated by layers of intergranular material. The increased $Sb_2O_3$ content promotes the formation of extra insulating material, Zn-Sb spinel, for example in the regions surrounded by zinc oxide grains. The insulating material acts to reduce the $\epsilon F_1$ product. Likewise, additional insulating material may be provided amidst zinc oxide grains by using silicon dioxide ($SiO_2$) or magnesium oxide (MgO) or other refractory materials in the varistor formulation. Suitable amounts of these other refractory materials may be added, these amounts ranging from approximately 1 to approximately 15 mole percent. For example, MgO promotes the formation of Mg-Zn spinel. In this way, varistors exhibiting $\epsilon F_1$ products below approximately $1.5\times 10^6$ volts/cm are easily fabricated.

From the above, it may be appreciated that the varistor of the present invention exhibits a uniform voltage distribution across each varistor in the stack thereby resulting in a long-lived varistor stack in which no particular stack varistors are subjected to above normal thermal stresses resulting in loss of stability and device failure. The varistors of the present invention accordingly exhibit a controlled capacitance depending upon the amount of antimony additive present in the varistor mix.

While this invention has been described with reference to particular embodiments and examples, other modifications and variations will occur to those skilled in the art in view of the above teachings. Accordingly, it should be understood that within the scope of the appended claims the invention may be practiced otherwise than is specifically described.

The invention claimed is:

1. An arrester for surge protection of power transmission lines comprising:

an elongated insulating housing having a ground terminal and a line terminal disposed at opposite ends thereof;

a plurality of metal oxide varistors disposed within said housing and configured in a stack, said varistors being electrically connected in series, the varistor at a first end of said stack being connected to said line terminal and the varistor at the second end of said stack being connected to said ground terminal, said varistors exhibiting increased intrinsic capacitance with increased proximity to said line terminal.

2. The arrester of claim 1 in which for each $i=0, 1, 2, \ldots, N$ the $i^{th}$ varistor in said stack is selected to exhibit an intrinsic capacitance, $C_{vi}$, given by the formula $C_{vi}=C_o+C_g(N-i)^2/2$, where $C_o=C_{vN}$ is the intrinsic capacitance of the varistor connected to said ground terminal, $C_g$ is a ground capacitance for the varistors in the stack, N is one less than the number of varistors in the stack, and i is an integer indicating the position of said $i^{th}$ varistor in said stack.

3. The arrester of claim 2 in which $C_O$ is approximately 650 picofarads, $C_g$ is approximately 3 picofarads, and $N+1$, the number of varistors in the stack, is 30.

4. The arrester of claim 1 in which the respective capacitances of said varistors are controllable by varying the respective $Sb_2O_3$ content thereof.

5. The arrester of claim 4 in which said $Sb_2O_3$ content is varied between approximately 1 mole percent and approximately 10 mole percent.

6. The arrester of claim 5 in which, in addition to the $Sb_2O_3$, the varistor comprises an approximate mixture of 0.2 mole percent $H_3BO_3$, 0.1 mole percent $BaCO_3$, 0.5 mole percent $Cr_2O_3$, 1.0 mole percent NiO, 0.5 mole percent $MnO_2$, 0.5 mole percent $Co_2O_3$, 0.5 mole percent $Bi_2O_3$, the remainder being ZnO.

7. A metal oxide varistor manufactured from a sintered mixture of zinc oxide and metal oxide additives, said varistor exhibiting a dielectric constant $\epsilon$ and a breakdown voltage $F_1$, said varistor comprising zinc oxide grains separated by intergranular material, said varistor also comprising insulating material between said zinc oxide grains such that the product $\epsilon F_1$ is less than $1.5\times10^6$ volts/cm.

8. The varistor of claim 7 in which the insulating material comprises materials selected from the group consisting of Zn-Sb spinel and Zn-Mg spinel.

9. The varistor of claim 7 in which said mixture approximately comprises 0.2 mole percent $H_3BO_3$, 0.1 mole percent $BaCO_3$, 0.5 mole percent $Cr_2O_3$, 1.0 mole percent NiO, 0.5 mole percent $MnO_2$, 0.5 mole percent $Co_2O_3$, 0.5 mole percent $Bi_2O_3$, and between 1 and 10 mole percent of material selected from the group consisting of $Sb_2O_3$, MgO, and $SiO_2$, the remainder being ZnO.

10. The varistor of claim 7 in which said mixture approximately comprises 0.2 mole percent $H_3BO_3$, 0.1 mole percent $BaCO_3$, 0.5 mole percent $Cr_2O_3$, 1.0 mole percent NiO, 0.5 mole percent $MnO_2$, 0.5 mole percent $Co_2O_3$, 0.5 mole percent $Bi_2O_3$, and between 1 and 15 mole percent of material selected from the group consisting of MgO and $SiO_2$, the remainder being ZnO.

11. The arrester of claim 2 in which said metal oxide varistors are manufactured from a sintered mixture of zinc oxide and metal oxide additives, said varistors each exhibiting a dielectric constant $\epsilon$ and a breakdown voltage $F_1$, said varistors comprising zinc oxide grains separated by intergranular material, said varistors also comprising insulating material between said zinc oxide grains such that the product $\epsilon F_1$ for at least one of said varistors is less than $1.5\times10^6$ volts/cm.

12. The varistor of claim 11 in which the insulating material comprises materials selected from the group consisting of Zn-Sb spinel and Zn-Mg spinel.

13. The varistor of claim 11 in which said mixture approximately comprises 0.2 mole percent $H_3BO_3$, 0.1 mole percent $BaCO_3$, 0.5 mole percent $Cr_2O_3$, 1.0 mole percent NiO, 0.5 mole percent $MnO_2$, 0.5 mole percent $Co_2O_3$, 0.5 mole percent $Bi_2O_3$, and between 1 and 15 mole percent of material selected from the group consisting of MgO and $SiO_2$, the remainder being ZnO.

* * * * *